United States Patent
Munoz Delgado

(10) Patent No.: US 11,790,639 B2
(45) Date of Patent: Oct. 17, 2023

(54) MEASURING THE SENSITIVITY OF IMAGE CLASSIFIERS TO MODIFICATIONS OF THE INPUT IMAGE

(71) Applicant: Robert Bosch GmbH, Stuttgart (DE)

(72) Inventor: Andres Mauricio Munoz Delgado, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 327 days.

(21) Appl. No.: 17/344,164

(22) Filed: Jun. 10, 2021

(65) Prior Publication Data

US 2021/0390350 A1    Dec. 16, 2021

(30) Foreign Application Priority Data

Jun. 12, 2020 (EP) .................................... 20179634

(51) Int. Cl.
```
G06V 10/70      (2022.01)
G06V 10/776     (2022.01)
G06F 18/21      (2023.01)
G06F 18/22      (2023.01)
G06F 18/214     (2023.01)
```
(Continued)

(52) U.S. Cl.
CPC .......... *G06V 10/776* (2022.01); *G06F 18/214* (2023.01); *G06F 18/217* (2023.01); *G06F 18/22* (2023.01); *G06F 18/2431* (2023.01); *G06V 10/774* (2022.01)

(58) Field of Classification Search
CPC .... G06V 10/776; G06V 10/774; G06F 18/22; G06F 18/214; G06F 18/217
See application file for complete search history.

(56) References Cited

U.S. PATENT DOCUMENTS

2018/0232601 A1    8/2018  Feng et al.
2019/0303717 A1   10/2019  Bhaskar et al.
(Continued)

FOREIGN PATENT DOCUMENTS

DE    102017211331 A1    1/2019
WO      2018197074 A1   11/2018

OTHER PUBLICATIONS

Wang et al., "A Fast and Robust Convolutional Neural Network-Based Defect Detection Model in Product Quality Control," International Journal of Advanced Manufacturing Technology, 2018, vol. 94, pp. 3465-3471.

(Continued)

*Primary Examiner* — Sam Bhattacharya
(74) *Attorney, Agent, or Firm* — NORTON ROSE FULBRIGHT US LLP; Gerard Messina

(57) ABSTRACT

A method for measuring the sensitivity of an image classifier, which assigns an input image to one or multiple classes of a predefined classification, to modifications of the input image. The method includes: the input image is mapped by at least one predefined operator onto an intermediate image, which has a lesser information content and/or a poorer signal-to-noise ratio in comparison to the input image; at least one generator is provided, which is trained to generate realistic images, which image classifier assigns to a specific class of the predefined classification; the generator is used to generate a variation of the input image from the intermediate image.

13 Claims, 3 Drawing Sheets

(51) Int. Cl.
*G06F 18/2431* (2023.01)
*G06V 10/774* (2022.01)

(56) References Cited

U.S. PATENT DOCUMENTS

2019/0378270 A1* 12/2019 Ida .......................... G06T 5/002
2020/0175352 A1   6/2020 Cha et al.

OTHER PUBLICATIONS

Manjurul Islam et al., "Vision-Based Autonomous Crack Detection of Concrete Structures Using a Fully Convolutional Encoder-Decoder Network," Sensors, MDPI, 2019, vol. 19, pp. 1-12.

* cited by examiner

MEASURING THE SENSITIVITY OF IMAGE CLASSIFIERS TO MODIFICATIONS OF THE INPUT IMAGE

CROSS REFERENCE

The present application claims the benefit under 35 U.S.C. § 119 of European Patent Application No. EP 20179634.9 filed Jun. 12, 2020, which is expressly incorporated herein by reference in its entirety.

FIELD

The present invention relates to controlling the behavior of trainable image classifiers, which may be used, for example, for the quality control of products produced in series.

BACKGROUND INFORMATION

In the series production of products, it is normally necessary to check the quality of the production continuously. The aim here is to detect quality problems as quickly as possible so as to be able to eliminate the cause as quickly as possible so as not to lose too many units of the respective product as rejects.

An optical check of the geometry and/or the surface of a product is quick and non-destructive. PCT Patent Application No. WO 2018/197 074 A1 describes a testing device, in which an object is able to be subjected to a plurality of illumination situations, a camera recording images of the object in each of these illumination situations. The topography of the object is evaluated from these images.

It is also possible to assign images of the product directly to one of several classes of a predefined classification using an image classifier on the basis of artificial neural networks. On this basis, it is possible to assign the product to one of several predefined quality classes. In the simplest case, this classification is binary ("OK"/"not OK").

SUMMARY

Within the scope of the present invention, a method is provided for measuring the sensitivity of an image classifier to changes of the input image.

In accordance with an example embodiment of the present invention, the image classifier assigns an input image to one or several classes of a predefined classification. Images of nominally identical products produced in series may be used as input images for example. The image classifier may be trained for example to assign the input images to one or several of at least two possible classes, which represent a quality assessment of the respective product.

For example, a product may be classified on the basis of an image in binary fashion as "OK" or "not OK" (NOK). A classification may also be possible and practical which comprises more intermediate stages between "OK" and "not OK".

The concept of an image fundamentally comprises any distribution of information situated in a two-dimensional or multi-dimensional grid. This information may comprise intensity values of image pixels, for example, which were recorded via any imaging modality such as an optical camera, a thermal image camera or by ultrasound, for example. It is also possible, however, to translate any other data, such as for example audio data, radar data or LIDAR data, into images and then to classify these equally.

In accordance with an example embodiment of the present invention, in the method, the input image is mapped by at least one predefined operator onto an intermediate image, which has a lesser information content and/or a poorer signal-to-noise ratio in comparison to the input image.

The information content may be understood for example in the sense of Shannon's information theory as the minimum number of independent parameters (for example bits), which are required in order to characterize the image and to transmit it via a channel for example.

Thus, for example, scaling down the input image to a lower pixel resolution has the effect that the intermediate image is completely described by this lower number of pixels. Nothing changes in this regard even when the intermediate image, after having been scaled down, is scaled up again to the original pixel resolution of the input image. A portion of the information originally contained in the input image is irretrievably lost.

The same is true if the input image is translated into a dimension-reduced representation using an encoder of an autoencoder structure. This is true regardless of whether this dimension-reduced representation is used directly as the intermediate image or whether for this purpose it is translated back into an image that has the same pixel resolution as the original input image. An autoencoder structure may comprise an encoder and a decoder for example, the encoder generating the dimension-reduced representation and the decoder retranslating this representation. It is then possible to train the encoder and the decoder jointly with the aim that the retranslation produces an image that is as similar as possible to the original input image.

Blurring at least a portion of the input image has the effect that the information in the image varies spatially more slowly, that is, that specific spatial frequencies are removed from the image. The image is thus described locally or even globally by fewer spatial frequencies. Thus, blurring also reduces the information content.

The signal-to-noise ratio of the intermediate image may be deteriorated in comparison to the input image for example in that an additive and/or multiplicative noise is added to the intermediate image.

An affine transformation is also able to reduce the information content of the intermediate image in comparison to the input image. Furthermore, the input image may also be mapped by a trained intermediate image generator onto an intermediate image having a lower information content and/or having a poorer signal-to-noise ratio. The intermediate image generator may be trained for example to generate an image from an input image that is encumbered with a noise that difficult to describe in analytical formulas. On the basis of exemplary images that feature this noise, the generator is able to learn to superpose this noise also onto entirely different images.

In accordance with an example embodiment of the present invention, at least one generator is provided, which is trained to generate images that are on the one hand realistic and that are on the other hand assigned by the image classifier to a specific predefined class of the predefined classification. This generator is used to generate a variation of the input image from the intermediate image. For this purpose, it is possible to supply to the generator, in addition to the intermediate image, also a random noise in order to generate many variations from one and the same intermediate image, which variations are sorted by the image classifier into a specific predefined class.

In this manner, for example, an input image, which the image classifier assigns to the "OK" class, may be specifically converted into a variation that is assigned by the image classifier to the "not OK" class. If there are further intermediate stages between "OK" and "not OK" as further classes, variations may also be specifically generated from the same input image that belong to one of these further classes. For this purpose, a separate generator may be responsible for each target class. It is also possible, however, to use a single "conditional" generator for example, for which the desired target class may be predefined.

In principle, it is also possible to supply the input image directly to a generator in order to obtain a variation in this manner. The reasoning for the detour via the intermediate image is that substantially greater modifications would have to be performed on the original input image in order to dissuade the image classifier from adhering to its original judgment and to assign the variation to another class. It is difficult to reconcile these substantially greater modifications with the objective that the variation is to be a realistic image.

Especially for the aforementioned use in quality control, it is important that the variation be realistic. What is sought here are precisely the type of effects that may occur in the real image recording and that result in the input image being classified differently.

In accordance with an example embodiment of the present invention, by generating at first an intermediate image having a reduced information content and/or a deteriorated signal-to-noise ratio, the uncertainty of the classification by the image classifier is substantially increased. At the same time, the intermediate image still retains the fundamental character of the input image, which resides primarily in the low-frequency components of the input image. Starting from this state having the increased uncertainty, only a comparatively small intervention in the image is required in order to turn this into a variation, which the image classifier assigns to a different class. This small intervention is still within the scope of what can be introduced into the image without taking away its realistic character.

In a particularly advantageous development of the present invention, the intermediate image generator is trained to generate realistic images that are as similar as possible to the input image and are at the same time classified by the image classifier with the greatest possible uncertainty. As explained above, by a small modification it is possible on this basis with high probability to change the class into which the image classifier sorts the intermediate image. The similarity to the input image may be measured for example using a cosine distance between the activations, which these images respectively produce in deep feature maps of a pre-trained neural network.

The variation provides immediately clear information regarding what concrete modification in the input image prompts the image classifier to assign the image to a different class than the previous class. If the particular class, to which the variation generated by the generator belongs, is a different class than the class, to which the image classifier assigns the input image, then a comparison of one or multiple variations with the input image directly provides those modifications that drive the image across decision limits between classes. On this basis, it is possible to evaluate the sensitivity of the image classifier to modifications of the input image both qualitatively as well as quantitatively. Alternatively or in combination with this, it is also possible to use any summarizing statistics across multiple variations for evaluating the sensitivity. Furthermore, it is also possible to ascertain for example the variation that is closest to the input image according to a cosine distance, feature clustering or any other metric.

For example, it may turn out that contaminations of the product occurring during the manufacturing process or reflections of light from the surface of the product in certain lighting conditions result in a flawless product being assigned to the class "not OK" and discarded as a reject.

Conversely, the analysis may also yield the result for example that specific deficiencies in the physical image recording in the quality control, such as a poor depth of field of the camera used or an insufficient illumination, result in an image of a faulty product being assigned to the class "OK" and the faulty product thus mistakenly passing the quality control. In a well-established manufacturing process, which provides great quantities of flawless products, quality deficiencies of individual products are very probably revealed in clearly definable individual defects. For example, a scratch may run across the surface, or a coating may have chipped off at a specific location. If such damage is made unrecognizable by poor image quality, the defective product may possibly not be recognized as such.

In order to be able to get to the bottom specifically of problems in the recording of images, a further particularly advantageous development of the present invention additionally varies the operator for generating the intermediate image, and evaluates the dependence of the sensitivity on the operator. The operator may be characterized by parameters for example, which may be varied. This analysis may reveal for example that a minimally poorer depth of field already deteriorates the detection of many faults markedly, while this detection still functions in a markedly poorer illumination situation.

It may also be discovered for example whether the image classifier possibly does not make decisions based on relevant features of the image at all, but on the basis of other features. For example, if features of the product itself are difficult to detect during the quality control, the image classifier might evade this problem and assess instead the robotic arm that holds the product to the camera.

In a further particularly advantageous development of the present invention, in response to the result that the ascertained sensitivity of the image classifier fulfills a predefined criterion, a product, to which the input image refers, is earmarked for a subsequent manual check and/or a conveying device is activated to separate this product from the production process. Then it is possible to save a substantial additional technical effort for recording and evaluating images within the scope of the automated quality control, which would otherwise be necessary in order to be able to clear up all cases of doubt and borderline cases in automated fashion. The subsequent manual check of a few specimen of a product manufactured in large quantity may be markedly more economical than increasing the success rate in the automated quality control to a measure, in which the cases of doubt to be checked subsequently would be completely eliminated.

The variations generated in the manner described may be used not only to measure the status quo with respect to the sensitivity of the image classifier to modifications of the input image. Rather, they may also be used to improve the training of the image classifier and thus in particular to sharpen the detection performance near the decision limit. For this reason, in a further advantageous development, the variation is used as a further training image for training the image classifier. These training images may be labeled manually for example with the class to which the image classifier is to assign them. This is not necessarily the same class, to which the input image was assigned.

The present invention also relates to a method for training a generator for use in the previously described method. In accordance with an example embodiment of the present invention, in the method, a plurality of training images is provided, it not being necessary to know for these training images into which class the image classifier should nominally classify which training image. Intermediate images are generated from the training images as described previously.

Now, parameters that characterize the behavior of the generator are optimized with the aim that the variations generated by the generator are assigned by the image classifier to a predefined class and are at the same time similar to the training images. This similarity may be measured with respect to all training images or only with respect to training images that the image classifier assigns to the same class as the variations to be generated by the generator.

The assignment to the specific predefined class, to which the variation is to be assigned by the image classifier, may be quantitatively measured using any desired metric. For example, the difference between the actual classification score and the desired classification score with respect to the predefined class may be measured using any desired standard.

The similarity of the variation to the training images may be measured particularly advantageously by determining to what extent a discriminator trained simultaneously or alternately with the generator is able to differentiate the variation from the training images. The basis for this comparison may be the variety of all training images or the variety only of those training images that the image classifier assigns to the same class as the variations to be generated by the generator. During the training, the generator and discriminator form a generative adversarial network (GAN), of which when measuring the sensitivity following the conclusion of the training only the generator continues to be used.

In a further particularly advantageous development of the present invention, the particular generator that generates images from the particular class, to which the image classifier also assigns the training image, is additionally trained with the aim of making the variation as similar as possible to the training image. This ensures that the generators do not learn merely to generate variations "from nothing" (i.e., from noise), but learn to reconstruct concrete input images. For this training, it is possible to assemble "batches" of input images, which the image classifier respectively assigns to the same class.

If an intermediate image generator is used for generating intermediate images, then it may be trained in particular simultaneously or alternately with the generator, for example. It is then possible, for example, to combine in a common cost function for the training the requirements that
- each generator generates variations that the image classifier actually classifies into the desired target class;
- each generator generates variations that are difficult to distinguish from training images generally or from training images of the desired target class;
- each generator optimally reconstructs input images that are classified by the image classifier into the desired target class;
- the intermediate image generator generates realistic images that are as similar as possible to the input image or at least still preserve the fundamental character of the input image; and
- the images generated by the intermediate image generator are at the same time classified by the image classifier with the greatest possible uncertainty, in an arbitrary weighting (optionally defined by hyperparameters) in a cost function (loss function). The training of the generators, as well as optionally of the intermediate image generator, may be performed using any optimization method, such as for example ADAM or gradient descent, on the basis of this cost function.

In accordance with the present invention, the methods may be in particular entirely or partially computer-implemented. For this reason, the present invention also relates to a computer program having machine-readable instructions, which, when they are executed on one or multiple computers, prompt the computer(s) to carry out one of the described methods. In this sense, control units for vehicles and embedded systems for technical devices, which are likewise able to execute machine-readable instructions, are also to be regarded as computers.

The present invention also relates to a machine-readable data carrier and/or to a download product comprising the computer program. A download product is a digital product transmittable via a data network, i.e., downloadable by a user of the data network, which may be offered for example in an online shop for immediate download.

Furthermore, a computer may be equipped with the computer program, with the machine-readable data carrier or with the download product.

Further measures improving the present invention are presented in greater detail below with reference to figures together with the description of the preferred exemplary embodiments of the present invention.

Further measures improving the present invention are presented in greater detail below with reference to figures together with the description of the preferred exemplary embodiments of the present invention.

DETAILED DESCRIPTION OF EXAMPLE EMBODIMENTS

Figure 1:
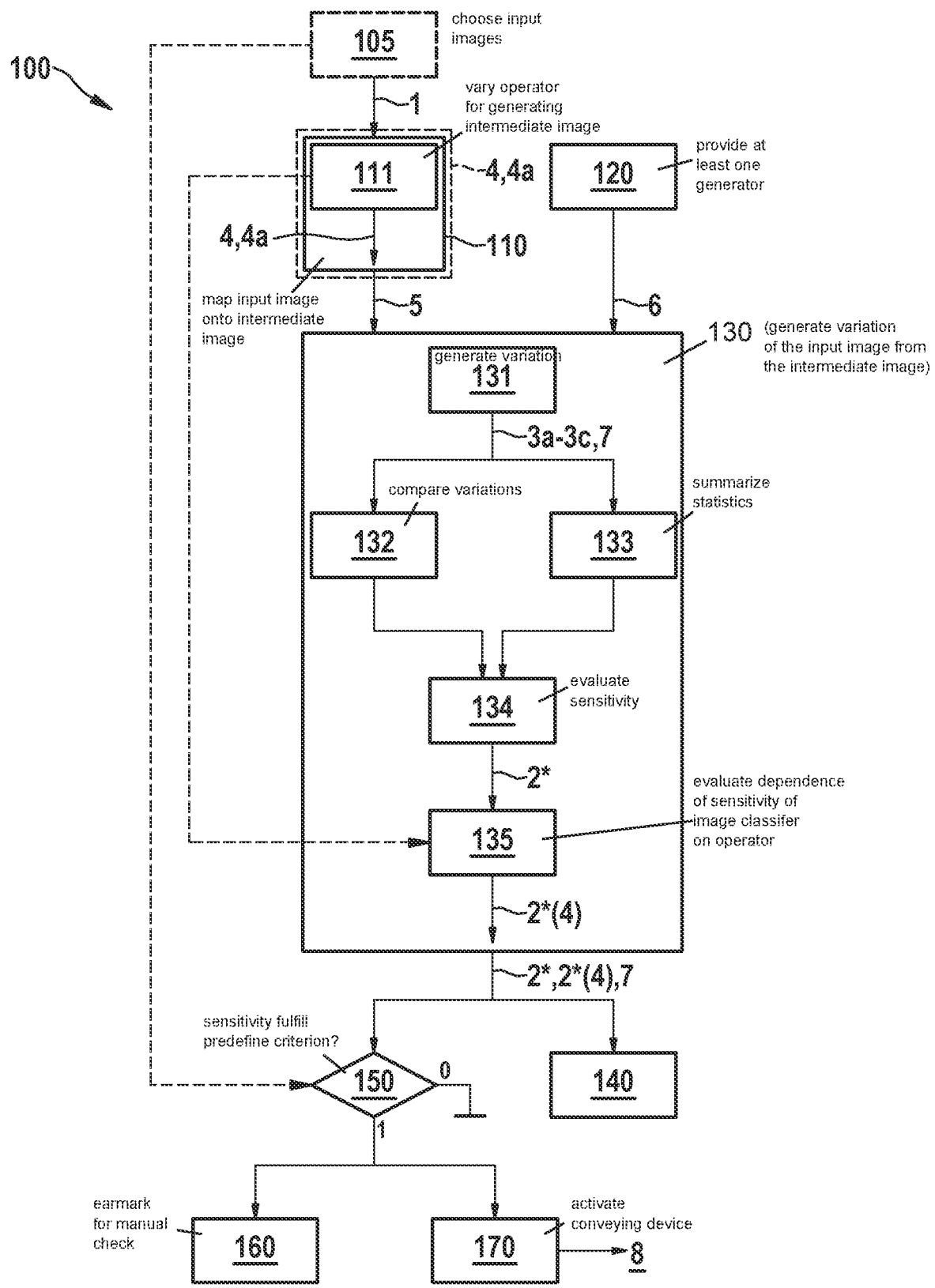
FIG. 1 shows an exemplary embodiment of method 100 for measuring the sensitivity 2* of an image classifier 2, in accordance with the present invention.

FIG. 1 is a schematic flow chart of an exemplary embodiment of method 100 for measuring the sensitivity 2* of an image classifier 2 to modifications of input image 1. In accordance with step 105, in particular images of nominally identical products produced in series may be chosen as input images 1, for example. Image classifier 2 may be trained for example to classify the input images 1 into classes 3*a*-3*c* of a predefined classification, which represent a quality assessment of the respective product.

In step 110, input image 1 is mapped by predefined operator 4, which may be in particular a trained intermediate image generator 4*a*, onto an intermediate image 5. This intermediate image 5 has a lower information content and/or a poorer signal-to-noise ratio in comparison to input image 1. In step 120, at least one generator 6 is provided. This generator 6 is trained to generate realistic images, which image classifier 2 assigns to a specific class 3a-3c of the predefined classification.

In particular, a separate generator 6 may be provided for each class 3a-3c. There are also applications, however, in which one single generator 6 suffices. For example, a question may be merely why products are classified into the worst of the quality classes 3a-3c and earmarked for rejection. A single generator 6 may then generate realistic images, which image classifier 2 classifies into this worst quality class 3a-3c.

In step 130, generator 6 is used to generate a variation 7 of the input image 1 from the intermediate image 5. In particular, according to block 131, this may be for example a variation 7 that is classified by image classifier 2 into a different class 3a-3c than the original input image 1. Variation 7 is then still recognizably based on original input image 1, but is modified in such a way that the decision limit of image classifier 2 between two classes is crossed. This directly embodies the sensitivity 2* of image classifier 2 with respect to modifications of input image 1.

The sensitivity 2* may be evaluated for example in accordance with block 134 from a comparison 132 of one or multiple variations 7 with input image 1 and/or from a summarizing statistics 133 over multiple variations 7. In accordance with block 111, it is then additionally possible to vary operator 4 for generating intermediate image 5 so that it is possible to evaluate, in accordance with block 135, the dependence of sensitivity 2* of image classifier 2 on operator 4. As explained previously, this makes it possible in particular to evaluate which measures reducing the information content, or what type or intensity of noise, have a particularly unfavorable effect on the classification by image classifier 2.

Variation 7 may be used not only as a measure for sensitivity 2*, however, but may additionally be used in step 140 as a further training image for training image classifier 2. Training images that are close to the decision limit of image classifier 2 are particularly well suited to sharpen this decision limit.

In step 150, a check may be performed to determine whether the ascertained sensitivity 2* of image classifier 2, possibly also expressed as dependence 2*(4) of this sensitivity 2* on operator 4, fulfills a predefined criterion. If this is the case (truth value 1), then it is possible in step 160 to earmark the product, to which input image 1 relates, for a subsequent manual check. Alternatively or also in combination with this, it is possible in step 170 to activate a conveying device 8 in order to separate this product from the production process.

Figure 2:
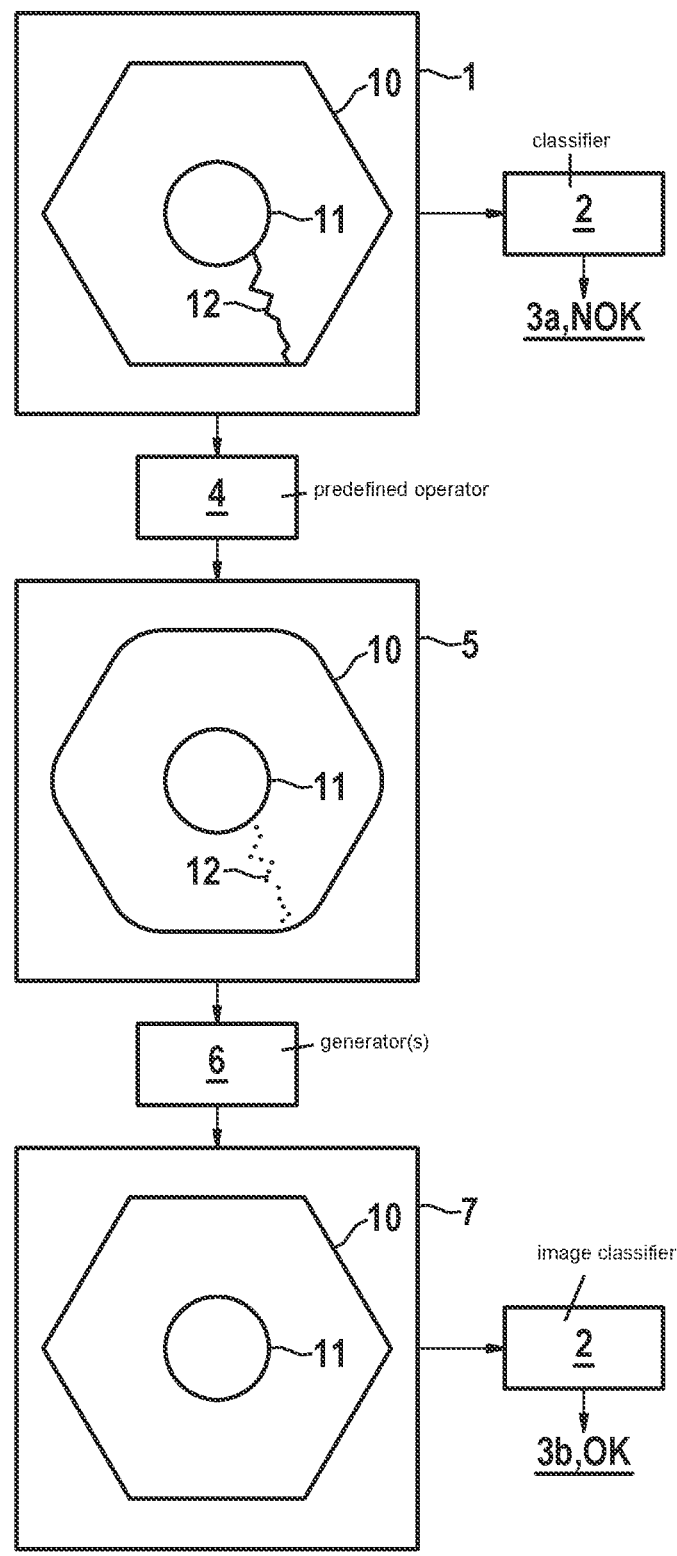
FIG. 2 shows an exemplary reclassification of variation 7 of an input image 1, in accordance with the present invention.

FIG. 2 shows by way of example how a variation 7 of an input image 1, by generating the information-reduced intermediate image 5 and subsequent reconstruction using generator 6, may have the result that variation 7 is classified by image classifier 2 into a different class 3a-3c than original input image 1.

Input image 1 shows a screw nut 10 in the form of a regular hexagon having an internal screw thread 11 in the middle. Due to a material or fabrication fault, a fissure 12 extends from the outer circumference of internal screw thread 11 to the outer edge of screw nut 10. If this input image 1 is supplied to image classifier 2, it is classified into class 3a, which corresponds to quality assessment "not OK" (NOK).

If the input is converted into an information-reduced intermediate image 5 by blur operator 4, however, the corners of screw nut 10 are rounded off. The basic form of the hexagon is still recognizable. The blurring operation, however, has the effect that fissure 16 is now only very faintly visible.

Generator 6 is trained to generate realistic images that are classified by image classifier 2 into class 3b, which corresponds to quality assessment "OK". If intermediate image 5 is supplied to this generator 6, the still visible remainder of fissure 12 disappears as well.

The comparison of variation 7 with the original input image 1 yields the result that fissure 12 makes the difference between a classification into class 3a—"NOK" and a classification into class 3b="OK".

Figure 3:
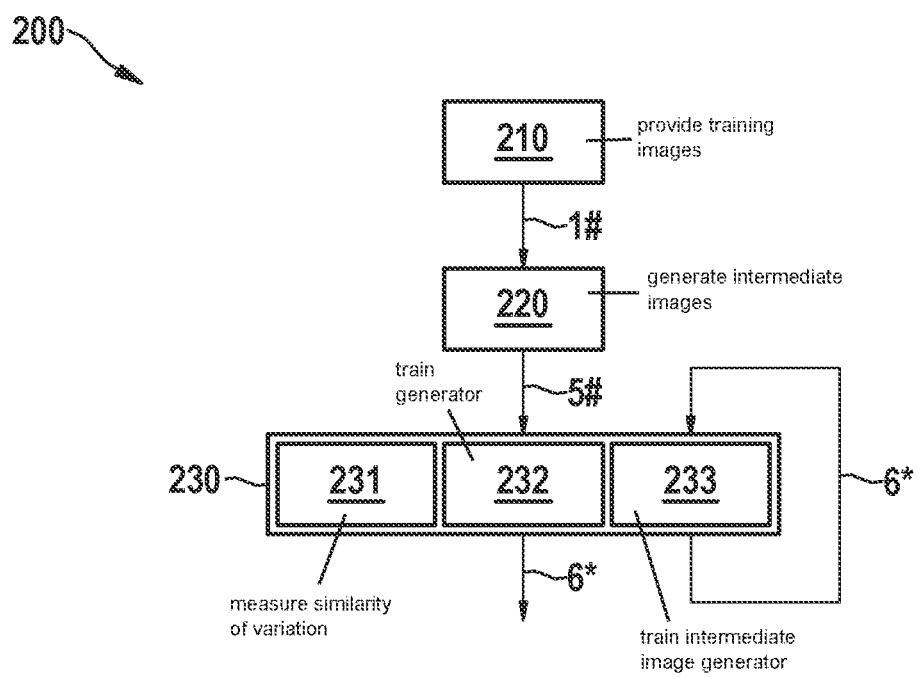
FIG. 3 shows an exemplary embodiment of method 200 for training a generator 6, in accordance with the present invention.

FIG. 3 is a schematic flow chart of an exemplary embodiment of method 200 for training a generator 6. In step 210, a plurality of training images 1# is provided. In step 220, intermediate images 5# are respectively generated from these training images 1# using at least one predefined operator 4.

In step 230, parameters 6*, which characterize the behavior of generator 6, are optimized with the aim that variations 7 generated by generator 6 are assigned by image classifier 2 to a predefined class 3a-3c and are at the same time similar to training images 1#.

In block 231, the similarity of variation 7 to training images 1# may be measured by determining to what extent a discriminator trained simultaneously or alternately with generator 6 is able to differentiate variation 7 from training images 1#.

In accordance with block 232, the particular generator 6 that generates images from the particular class 3a-3c, to which image classifier 2 also assigns training image 1#, may additionally be trained with the aim of making variation 7 as similar as possible to training image 1#.

In accordance with block 233, an intermediate image generator 4a, which generates intermediate images 5, may be trained simultaneously or alternately with generator 6.

The optimization of parameters 6* may be continued until any desired termination criterion is fulfilled. The fully trained state of parameters 6* characterizes the finished generator 6.

What is claimed is:

1. A method for measuring a sensitivity of an image classifier, which assigns an input image to one or multiple classes of a predefined classification, to modifications of the input image, comprising the following steps:
   mapping the input image by at least one predefined operator onto an intermediate image, which has a lesser information content and/or a poorer signal-to-noise ratio in comparison to the input image;
   providing at least one generator, which is trained to generate realistic images, which the image classifier assigns to a specific class of the predefined classification;
   generating, using the generator, a variation of the input image from the intermediate image, wherein the specific class, to which the variation generated by the generator belongs, is a different class than a class to which the image classifier assigns the input image; and
   evaluating the sensitivity of the image classifier to modifications of the input image:
   from a comparison of one or multiple variations with the input image, and/or
   from a summarizing statistics across multiple variations.

2. The method as recited in claim 1, wherein the predefined operator includes:
   scaling the input image down to a lower pixel resolution; and/or generating a dimension-reduced representation of the input image using an encoder of an autoencoder structure; and/or adding additive and/or multiplicative noise; and/or blurring at least one portion of the input image; and/or at least one affine transformation; and/or a further trained intermediate image generator.

3. The method as recited in claim 2, wherein the intermediate image generator is trained to generate realistic images that are both (i) as similar as possible to the input image, and (ii) classified by the image classifier with a greatest possible uncertainty.

4. The method as recited in claim 1, wherein additionally the operator is varied for generating the intermediate image and a dependence of the sensitivity of the image classifier on the operator is evaluated.

5. The method as recited in claim 1, wherein the variation is used as a further training image for training the image classifier.

6. The method as recited in claim 1, wherein images of nominally identical products produced in series are selected as input images and the image classifier is trained to assign the input images to one or several of at least two possible classes, which represent a quality assessment of the respective products.

7. The method as recited in claim 6, wherein in response to an ascertained sensitivity of the image classifier fulfilling a predefined criterion, a product, to which the input image refers, is earmarked for a subsequent manual check and/or a conveying device is activated to separate the product from the production process.

8. A method for training a generator, comprising the following steps:

providing plurality of training images;

generating respective intermediate images from the training images using at least one predefined operator;

optimizing parameters, which characterize a behavior of the generator, with an aim that variations generated by generator are both: (i) assigned by an image classifier to a predefined class, and (ii) similar to the training images.

9. The method as recited in claim 8, wherein the similarity of the variation to training images is measured by determining to what extent a discriminator trained simultaneously or alternately with the generator is able to differentiate the variation from training images.

10. The method as recited in claim 8, wherein the particular generator that generates images from a particular class, to which the image classifier also assigns the training image, is additionally trained with an aim of making a variation as similar as possible to the training image.

11. The method as recited in claim 8, wherein an intermediate image generator, which generates intermediate images, is trained simultaneously or alternately with the generator.

12. A non-transitory machine-readable data carrier on which is stored a computer program for measuring a sensitivity of an image classifier, which assigns an input image to one or multiple classes of a predefined classification, to modifications of the input image, the computer program, when executed by a computer, causing the computer to perform the following steps:

mapping the input image by at least one predefined operator onto an intermediate image, which has a lesser information content and/or a poorer signal-to-noise ratio in comparison to the input image;

providing at least one generator, which is trained to generate realistic images, which the image classifier assigns to a specific class of the predefined classification;

generating, using the generator, a variation of the input image from the intermediate image, wherein the specific class, to which the variation generated by the generator belongs, is a different class than a class to which the image classifier assigns the input image; and evaluating the sensitivity of the image classifier to modifications of the input image:

from a comparison of one or multiple variations with the input image, and/or from a summarizing statistics across multiple variations.

13. A computer configured to measure a sensitivity of an image classifier, which assigns an input image to one or multiple classes of a predefined classification, to modifications of the input image, the computer configured to:

map the input image by at least one predefined operator onto an intermediate image, which has a lesser information content and/or a poorer signal-to-noise ratio in comparison to the input image;

provide at least one generator, which is trained to generate realistic images, which the image classifier assigns to a specific class of the predefined classification;

generate, using the generator, a variation of the input image from the intermediate image, wherein the specific class, to which the variation generated by the generator belongs, is a different class than a class to which the image classifier assigns the input image; and evaluate he sensitivity of the image classifier to modifications of the input image:

from a comparison of one or multiple variations with the input image, and/or from a summarizing statistics across multiple variations.

* * * * *